US006901436B1

(12) United States Patent
Schneider

(10) Patent No.: US 6,901,436 B1
(45) Date of Patent: *May 31, 2005

(54) METHOD, PRODUCT, AND APPARATUS FOR DETERMINING THE AVAILABILITY OF SIMILAR IDENTIFIERS AND REGISTERING THESE IDENTIFIERS ACROSS MULTIPLE NAMING SYSTEMS

(76) Inventor: Eric Schneider, 13944 Cedar Rd., #258, University Hts., OH (US) 44118

( * ) Notice: Subject to any disclaimer, the term of this patent is extended or adjusted under 35 U.S.C. 154(b) by 589 days.

This patent is subject to a terminal disclaimer.

(21) Appl. No.: 09/650,827

(22) Filed: Aug. 30, 2000

Related U.S. Application Data

(60) Provisional application No. 60/175,825, filed on Jan. 13, 2000, provisional application No. 60/160,125, filed on Oct. 18, 1999, provisional application No. 60/157,075, filed on Oct. 1, 1999, provisional application No. 60/143,859, filed on Jul. 15, 1999, provisional application No. 60/135,751, filed on May 25, 1999, and provisional application No. 60/125,531, filed on Mar. 22, 1999.

(51) Int. Cl.[7] .......................... G06F 15/16; G06F 17/30
(52) U.S. Cl. .......................... 709/219; 709/217; 707/10
(58) Field of Search ........................ 709/203, 217–219; 707/1–5, 10, 104.1

(56) References Cited

U.S. PATENT DOCUMENTS

| 5,881,131 A | | 3/1999 | Farris et al. ............. 379/15.03 |
|---|---|---|---|
| 6,009,459 A | | 12/1999 | Belfiore et al. ............. 709/203 |
| 6,151,624 A | * | 11/2000 | Teare et al. .................. 709/217 |
| 6,256,671 B1 | * | 7/2001 | Strentzsch et al. .......... 709/227 |
| 6,338,082 B1 | * | 1/2002 | Schneider .................... 709/203 |
| 6,442,549 B1 | * | 8/2002 | Schneider .................... 707/10 |
| 6,560,634 B1 | * | 5/2003 | Broadhurst ................. 709/203 |
| 6,678,717 B1 | | 1/2004 | Schneider ................... 709/203 |

OTHER PUBLICATIONS

Request for Comment (RFC) 1034, DOMAIN NAMES—Concepts and Facilties, Mockapetris, Nov. 1987, pp. 1–55.*

Request for Comment (RFC) 1035, DOMAIN NAMES—Implementation and Specifications, Mockapetris, Nov. 1987, pp. 1–55.*

(Continued)

*Primary Examiner*—Beatriz Prieto

(57) ABSTRACT

A device, network access apparatus, servlet, applet, stand alone executable program having a text box object, or web browser receives a selected identifier and determines whether the selected identifier of a first naming system is available. A prompt may be displayed for a user to determine whether the available identifier is to be allocated. When there is no allocation of the selected identifier or when a selected identifier is not available, a user may be prompted to search for the availability of another identifier of the first naming system. When the selected identifier is allocated, the availability of an identifier in a second naming system that is similar or identical to the allocated identifier of the first naming system may be searched. When it is determined that a matching identifier in a second naming system is found, then it is further determined whether the matching identifier is to be registered at this time. If this is the case, then the identifier of the second naming system may be registered. If there is no search for a matching identifier, or no matching identifier of a search is found, or a found matching identifier is not registered at this time, then it may be determined whether the allocated identifier of the first naming system is to be registered at this time. If this is the case, then the identifier of the first naming system may be registered. After registration or when it is determined that any allocated identifiers of any naming system will not be registered at this time then all unregistered identifiers may be released from allocation.

20 Claims, 13 Drawing Sheets

OTHER PUBLICATIONS

Request for Comment (RFC) 1480, The US DOMAIN, Cooper & Postel, Jun. 1993, pp. 1–47.*

Request for Comment (RFC) 2276, Architecture Principles of Uniform Resource Name Resolution, Sollins, Jan. 1998, pp. 1–24.*

PGMedia, Inc. d/b/a Name.Space TM, v. Network Solutions, Inc., et. al., Samson, M., , Mar. 1999, pp. 1–2.*

Domain Name Conflicts: Hey! That's My.Com!, Liberto, S.M., WWWiz Magazine, Mar. 1998, pp. 1–3.*

Learning Cyberlaw in Cyberspace, Name Conflicts, Cabell, D., Berkman Cneter for Internet & Society, Harvard Law School, Aug. 1999, pp. 1–21.*

Poors Richard Web Site News, Kent, P., Top Floor Publishing, 1998, pp. 1–3.*

Network Solutions, Inc., Online Team up to server Internet needs of small business owners, Jan. 1998, pp. 1–2.*

CNET News.com: NSI domain slowdown persists, Goodin, D., Jan. 1999, pp. 1–4.*

Windows IT Library: Domain Name Services, Northrup, T., Jul. 1998, pp. 1–41.*

* cited by examiner

TELEPHONE BILL FOR JOHN DOE FROM 04/0199-05/01/99
For Telephone Number: 216-555-1234 — 610

~~~~~~~~~~~~~~~~~~~~~~~~~~~~~~

TOTAL DUE:        $103.95

Dear John,

It has come to our attention that the following telephone numbers are currently available:
1-330-555-1234          1-800-555-1234 — 630

Call 1-800-TELENAMES to subscribe to any of these available telephone numbers.

It has come to our attention that the following domain names are currently available:
555-1234.COM       216-555-1234.COM   615
555-1234.NET       216-555-1234.NET Most customers select a domain name of this form:
216-555-1234.COM — 625        ‖‖ ‖‖ ‖‖ ‖‖ — 620

If you would like us to reserve for you this or any other domain name
then contact us at 1-800-TELENAMES
or visit our website at www.telenames.com for more details.

Upon reservation, Registrar fees plus any other charges
for related services will be applied to your next phone bill.

Best Regards,
Your Phone Company

*Fig. 6*

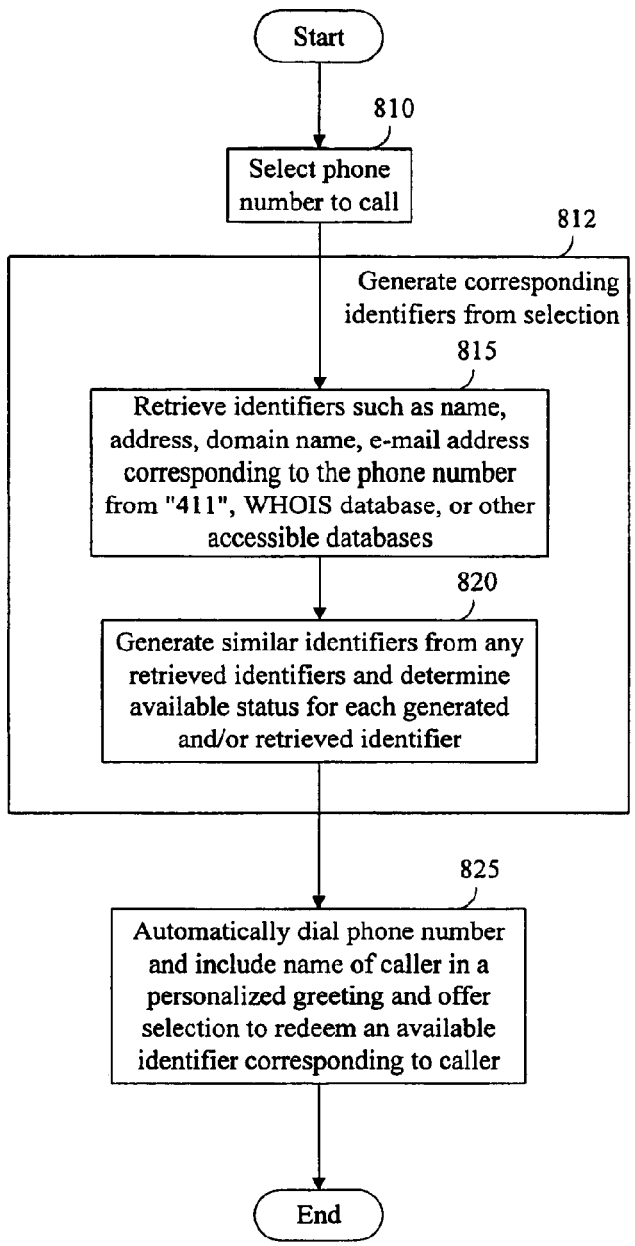
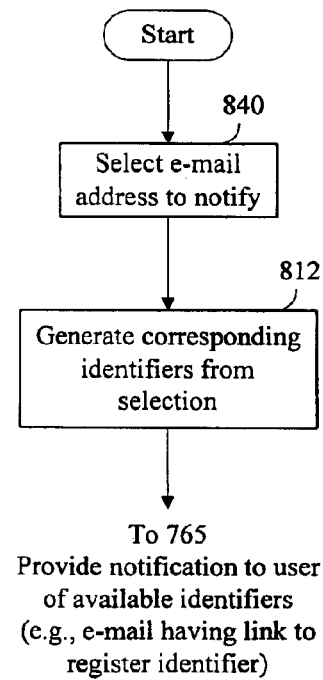
*Fig. 8a*
*Fig. 8b*

METHOD, PRODUCT, AND APPARATUS FOR DETERMINING THE AVAILABILITY OF SIMILAR IDENTIFIERS AND REGISTERING THESE IDENTIFIERS ACROSS MULTIPLE NAMING SYSTEMS

OTHER APPLICATIONS

This application claims the benefit of the following patent applications, which are hereby incorporated by reference:

1. U.S. patent application Ser. No. 09/532,500 filed Mar. 21, 2000, by Schneider, entitled "Fictitious domain name method, product, and apparatus", which claims the benefit of U.S. patent application Ser. No. 09/525,350 filed Mar. 15, 2000, now patent 6,338,082 issued on Jan. 8, 2002, by Schneider, entitled "Method for integrating domain name registration with domain name resolution" and claims the benefit of U.S. Provisional Application Ser. No. 60/143,859 filed Jul. 15, 1999, by Schneider entitled "Method and apparatus for generation, registration, resolution, and emulation of name space", now abandoned, U.S. Provisional Application No. 60/135,751 filed May 25, 1999, by Schneider entitled "Method and system for name space resolution", now abandoned and U.S. Provisional Application No. 60/125,531 filed Mar. 22, 1999, by Schneider entitled "Method and system for the emulation of name space", now abandoned.
2. U.S. Provisional Application Ser. No. 60/175,825 filed Jan. 13, 2000, by Schneider, entitled "Method and apparatus for determining the availability of similar identifiers across naming systems."
3. U.S. patent application Ser. No. 09/440,606 filed Nov. 15, 1999, by Schneider, entitled "Method and apparatus for information delivery", which claims the benefit of U.S. Pat. No. 5,987,464 filed Jul. 25, 1997, by Schneider entitled "Method and apparatus for periodically updating data records having an expiry time."
4. U.S. Provisional Application Ser. No. 60/160,125 filed Oct. 18, 1999, by Schneider, entitled "Method and system for integrating resource location, search services, and registration services."
5. U.S. Provisional Application Ser. No. 60/157,075 filed Oct. 1, 1999, by Schneider, entitled "Method and apparatus for integrating resource location and registration services of valid and fictitious domain names."

FIELD OF THE INVENTION

This invention generally relates to identifiers and naming systems, and more specifically relates to a method, product, and apparatus for determining the availability of similar identifiers across naming systems.

BACKGROUND OF THE INVENTION

Name space is a set of names in which all names are unique. Address space is a set of addresses in which all addresses are unique. Names are commonly used as mnemonic devices to help remember information. For instance, names are used to remember telephone numbers, and domain names are used to remember Internet addresses. A recent area of worldwide concern is the allocation of name space for the Internet.

The Internet is a vast computer network consisting of many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may issue the data and a client computer displays or processes it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Client side browsers, such as Netscape Navigator and/or Microsoft Internet Explorer (MSIE) provide graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which may be used as a query to access a database server and generate an HTML web page with customized data results as output that is passed back to the client browser for display.

The Web is a means of accessing information on the Internet that allows a user to "surf the web" and navigate the Internet resources intuitively, without technical knowledge. The Web dispenses with command-line utilities, which typically require a user to transmit sets of commands to communicate with an Internet server. Instead, the Web is made up of millions of interconnected web pages, or documents, which may be displayed on a computer monitor. Hosts running special servers provide the Web pages. Software that runs these Web servers is relatively simple and is available on a wide range of computer platforms including PC's.

A network resource identifier such as a Uniform Resource Identifier (URI) is a compact string of characters for identifying an abstract or physical resource. URIs are the generic set of all names and addresses that refer to objects on the Internet. URIs that refer to objects accessed with existing protocols are known as Uniform Resource Locators (URLs). A URL is the address of a file accessible on the Internet. The URL includes the name of the protocol required to access the resource, a domain name, or IP address that identifies a specific computer on the Internet, and a hierarchical description of a file location on the computer. For example the URL "http://www.example.com/index.html", where "http" is the scheme or protocol, "www.example.com" is the Fully Qualified Domain Name (FQDN), and "index.html" is the filename located on the server.

Because an Internet address is a relatively long string of numbers (e.g., 31.41.59.26) that is difficult to remember, Internet users rely on domain names, memorable and sometimes catchy words corresponding to these numbers, in order to use electronic mail (e-mail) and to connect to Internet sites on the Web. The Domain Name System (DNS) is a set of protocols and services on a network that allows users to utilize domain names when looking for other hosts (e.g., computers) on the network. The DNS is composed of a distributed database of names. The names in the DNS database establish a logical tree structure called the domain name space. Each node or domain in the domain name space is named and may contain subdomains. Domains and subdomains are grouped into zones to allow for distributed administration of the name space.

The DNS provides a mechanism so backup databases may be identified in case the first one becomes unavailable. DNS databases are updated automatically so that information on one name server does not remain out-of-date for long. A client of the DNS is called a resolver; resolvers are typically located in the application layer of the networking software of each TCP/IP capable machine. Users typically do not interact directly with the resolver. Resolvers query the DNS by directing queries at name servers, which contain parts of the distributed database that is accessed by using the DNS protocols to translate domain names into IP addresses needed for transmission of information across the network.

A domain name consists of two parts: a host and a domain. Technically, the letters to the right of the "dot" (e.g., tut.net) are referred to as Top Level Domains (TLDs), while hosts, computers with assigned IP addresses that are listed in specific TLD registries are known as second-level domains (SLDs). For the domain name "tut.net", ".net" is the TLD, and "tut" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3 LDs) such as "king.tut.net", are subsidiary to TLDs in the hierarchy of the Internet's DNS.

There are two types of top-level domains, generic and country code. Generic top-level domains (gTLDs) were created to allocate resources to the growing community of institutional networks, while country code top-level domains (ccTLDs) were created for use by each individual country, as deemed necessary. More than 240 national, or country-code TLDs (e.g., United States (.us), Japan (.jp), Germany (.de), etc.) are administered by their corresponding governments, or by private entities with the appropriate national government's acquiescence. A small set of gTLDs does not carry any national identifier, but denote the intended function of that portion of the domain space. For example, ".com" was established for commercial networks, ".org" for not-for-profit organizations, and ".net" for network gateways. The set of gTLDs was established early in the history of the DNS and has not been changed or augmented in recent years (COM, ORG, GOV, and MIL were created by January 1985, NET in July 1985, and INT was added in November 1988).

The DNS is operated by a Network Information Center (NIC) in each country to act as authority for administering the respective ccTLD zone file portion of the DNS database. The Internet Network Information Center (InterNIC) previously administered by the National Science Foundation (NSF), was formed to preside as authority over the gTLD zone files. In 1993, InterNIC was privatized and Network Solutions Inc. (NSI) was chosen to perform the registration and propagation of these key gTLDs, under a five-year cooperative agreement with the NSF.

Domain name registration for a given NIC authority may be accessed by a TCP/IP application called WHOIS, which queries a NIC database to find the name of network and system administrators, system and network points-of-contact, and other individuals who are registered in appropriate databases. Domain names are identifiers used for accessing a resource and retrieving contact information of the registrant or domain name holder of that resource. The availability of a domain name from a NIC authority for a given TLD may be determined by submitting a WHOIS request. When no match in the respective WHOIS database is found, then the domain name is most probably available for registration.

A system or process is typically modeled by defining the elements or components within such a system and further defining the corresponding relationships of such elements with each other and/or the relationships of such elements to other systems and their respective elements. Elements or components are most typically defined as objects having properties or functions associated with such objects. Objects are distinguished by assigning a unique identifier for each object creating an object space. Identifiers are symbols, markings, characters, names, or labels used for distinguishing, tracking, tagging, coding, sorting, routing, locating, linking, and organizing any combination of objects, resources, and addresses of a given system or across multiple systems. Indicia are identifiers used for referencing objects of physical or abstract resources. An identifier is static and has a persistence that usually takes the form of a name or label to help people remember and commonly agree upon the identification of an object for a given system. In effect, for any given object space there is typically defined an associated naming system. In some naming systems, identifiers may be allocated, assigned, reserved, subscribed, or registered to an object or entity such as an individual or organization. Examples of such registered identifiers include Social Security Numbers (SSN), license plate numbers, Universal Product Codes (UPC), International Standard Book Numbers (ISBN), trademarks, tradenames, company names, stock symbols, broadcast station call letters, telephone numbers, domain names, keywords, screen names, usernames, etc.

Each naming system has respectively originated and evolved for its own reasons, in its own way and in its own time. Identifiers take on meaning only from within its own naming system and generally remains exclusive to other naming systems. In recent years, identifiers are beginning to persist across other naming systems. For instance, there is a recent correspondence between telephone numbers and trademarks. During the early 1970's, as 1-800 toll free numbers were introduced, industry recognized and extended the use of mnemonics for commercial advertising and name branding. During the 1980's, 1-800 names were popularized to the point where brokers would buy names with the hope of selling or leasing the 1-800 names from their growing portfolio. In fact, courts have almost unanimously held that telephone mnemonics may be protected as trademarks.

Another area of crossover for identifiers is with respect to trademarks and domain names. Historically, Internet domain names were assigned on a "first come, first serve" basis. On the Internet, until very recently, no trademark searches are done, and unlike other computer networks, no central authority exists. Due to recent trademark infringement controversies, applications for domain names now require applicants to state that they have a commercial right to use the applied for name. The assignment of domain names has been administered by InterNIC.

InterNIC has recently issued a revised "Domain Dispute Resolution Policy Statement" in response to the large number of trademark disputes involving domain. The new policy requires applicants to defend, indemnify and hold harmless InterNIC for any liability arising from certain claims related to the use or registration of the domain name. These claims include trademark of service mark infringement, tortuous interference with contract or prospective business advantage and unfair competition. The policy provides that if a third party, without a federally registered trademark or service mark, claims that a domain name infringes its trademark or service marks, the owner of the domain name will be allowed to continue to use the domain name unless a court or arbitrator issues an order to the contrary. InterNIC reserves the right to withdraw a domain name if it receives such an order stating that the domain name belongs to a third party.

If InterNIC, however, receives evidence that a registered domain name is identical to that of a third party's registered trademark or service mark, the owner of the domain name must provide InterNIC with a certified copy of its own federal trademark or service mark registration for the mark being used as the domain name. In the event the owner of the domain name cannot do so, InterNIC will aid in finding a new domain name and will provide a 90-day transition period during which both domain names will be used simultaneously. After the 90 days, the disputed name will be put on hold status until the dispute is resolved. In the event the domain name owner can provide InterNIC with federal registration, then the domain name owner can continue to use the domain name until InterNIC receives a court or arbitration order providing otherwise. The domain name owner must agree to indemnify InterNIC from any liability and post a bond in an amount that will satisfy the third party's claim. Failure to do so allows InterNIC to place the domain name on hold status until the dispute is resolved.

As is clearly evident from the above, the assignment and management of identifiers, for example, domain names, is extremely important. Efficient methods of implementing a process for the assignment of domain names is of paramount importance. As a result, there have been some services that have incorporated the extra step of searching for trademark conflicts prior to the registration of a domain name. Services of this nature can be found at web addresses such as "http://www.thomson-thomson.com" or "http://nameprotect.com".

U.S. Pat. No. 5,881,131 issued on Mar. 9, 1999 by Farris, et al., entitled, "Analysis and validation system for provisioning network related facilities" discloses a service order processing system which determines a service request is provisionable and automatically provisions customer facilities including at least one of a domain name, a user name, a customer network address, and an electronic mail address, to execute the service request based upon information stored by the service order processing system. In addition, the '131 patent discloses a system to access various trademark/tradename databases for determining any trademark conflicts with respect domain name availability. Such a system is used to provision physical network facilities as well as logical network facilities, such as identification related data, electronic mail, user name, domain name, and the like. Though the system contemplates the provisioning of identifiers for different naming systems, there is no mention or teaching of provisioning identifiers that intentionally have a specific correlation or connection to each other in order to help create a more unified identity across multiple naming systems.

WIPO Patent Application WO9909726A1 published on Feb. 25, 1999 by Broadhurst, entitled, "Method of determining unavailability of internet domain names" discloses an improved query server that overcomes the shortcomings of existing domain name searching techniques by performing a multitude of searches simultaneously, transparent to the user. Specifically, the improved query server searches for existing domain name records in various domains and then displays the results in a formatted manner, thus eliminating the need for a user to perform individual searches. However, such techniques of finding similar identifiers are applied to the DNS only, which is a single naming system and does not consider multiple naming systems.

Co-pending provisional patent application Ser. No. 60/157,075 filed Oct. 1, 1999, by Schneider, entitled "Method and apparatus for integrating resource location and registration services of valid and fictitious domain names" discloses a robust system for managing both the resolution and registration of domain names having either a TLD or a TLDA (top level domain alias). However, there is no mention in the specification of the simultaneous registration of an identifier that can have both a TLD and TLDA.

RealNames Corporation and other companies like Netword, Inc. use plain language as a means for resource location and have developed their own version of resolution services by administering a keyword registry. Through partnerships and distribution channels, many web sites offer the possibility of searching for or even registering either a RealNames "Internet Keyword" or a domain name. But none of these sites integrate these separate services to determine the simultaneous availability and/or registration of a similar identifier across plural naming systems.

To date, the determination of the availability and/or registration of similar identifiers across naming systems have never been specified leaving the availability and/or registration of such identifiers as steps to be determined independently. New utility can be demonstrated by combining the registration of these naming systems. Accordingly, in light of the above, there is a strong need in the art for a method, product, and apparatus for determining the availability of similar identifiers across naming systems.

SUMMARY OF THE INVENTION

The present invention enables an entity to unify an identity across naming systems. The invention assists providers with name generation and the suggestive selling of identifiers. The present invention integrates domain name information services into a telephone ordering and service system. The invention enables callers to hear the WHOIS record in response to requesting more information from a domain name. The present invention allows for the concurrent registration of similar identifiers in different namespaces (e.g., phone number/domain name, keyword/domain name, and domain name/TLDA name).

The invention allows for the modification of documents, bills, and messages that suggest desirable identifiers to customers that are available for registration (e.g., listing to a subscriber the availability of the same telephone number across other area codes, or across TLDs of the DNS). The present invention helps unify a continuous identity by registering the same identifier and/or similar identifiers across a plurality of separate namespaces or naming systems. The invention generates personalized identifiers in response to caller ID, user logins, automated dialing programs, and bulk message programs.

In general, in accordance with the present invention a method for registering an identifier includes the steps of selecting a first naming system from one of a plurality of registerable naming systems, selecting at least one first identifier from the first naming system, determining whether the first identifier is available for registration, selecting a second naming system from one of a plurality of registerable naming systems wherein the second naming system is a different naming system from the first naming system, selecting at least one second identifier from the second naming system, determining whether the second identifier is available for registration, and registering at least one identifier in response to determining that one of a first identifier and second identifier is available for registration.

In addition, the first identifier and second identifier may be the same or similar identifier, or the first identifier may include a portion of the second identifier or the second identifier may include a portion of the first identifier. The first identifier may be generated and the second identifier may be generated from the first identifier. Each identifier may be considered a primary identifier that may be generated by consulting from one of a word generation method, rhyming method, dictionary, thesaurus, list of desirable descriptors, personal identifier portfolio, competitor identifier portfolio, phonetic spelling, mnemonic method, set of heuristic naming rules, namespace syntax, identifier equivalent, identifier mapping, and delimiter mapping. The second identifier may be automatically selected in response to selecting the first identifier or in response to determining whether the first identifier is available for registration. Each identifier and each naming system may be concurrently selected, determined available, and registered from a unified registration form interface. The first identifier may be allocated when it is determined that the first identifier is available for registration, and released from allocation when it is determined that the first identifier will not be registered. The second identifier may be determined available for registration while the first identifier is allocated.

In accordance with yet additional aspects of the present invention, an apparatus which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF THE DRAWINGS

FIG. 6 is an illustration of a document or message that suggests the availability of an identifier of potential interest to the recipient in accordance with the present invention.

FIG. 8a is a flowchart illustrating the steps performed for suggesting personalized available identifiers that correspond to a callee from an automated dialing system in accordance with the present invention.

FIG. 8b is a flowchart illustrating the steps performed for suggesting personalized available identifiers that correspond to a recipient via a bulk message system in accordance with the present invention.

DETAILED DESCRIPTION OF THE INVENTION

Figure 1A:
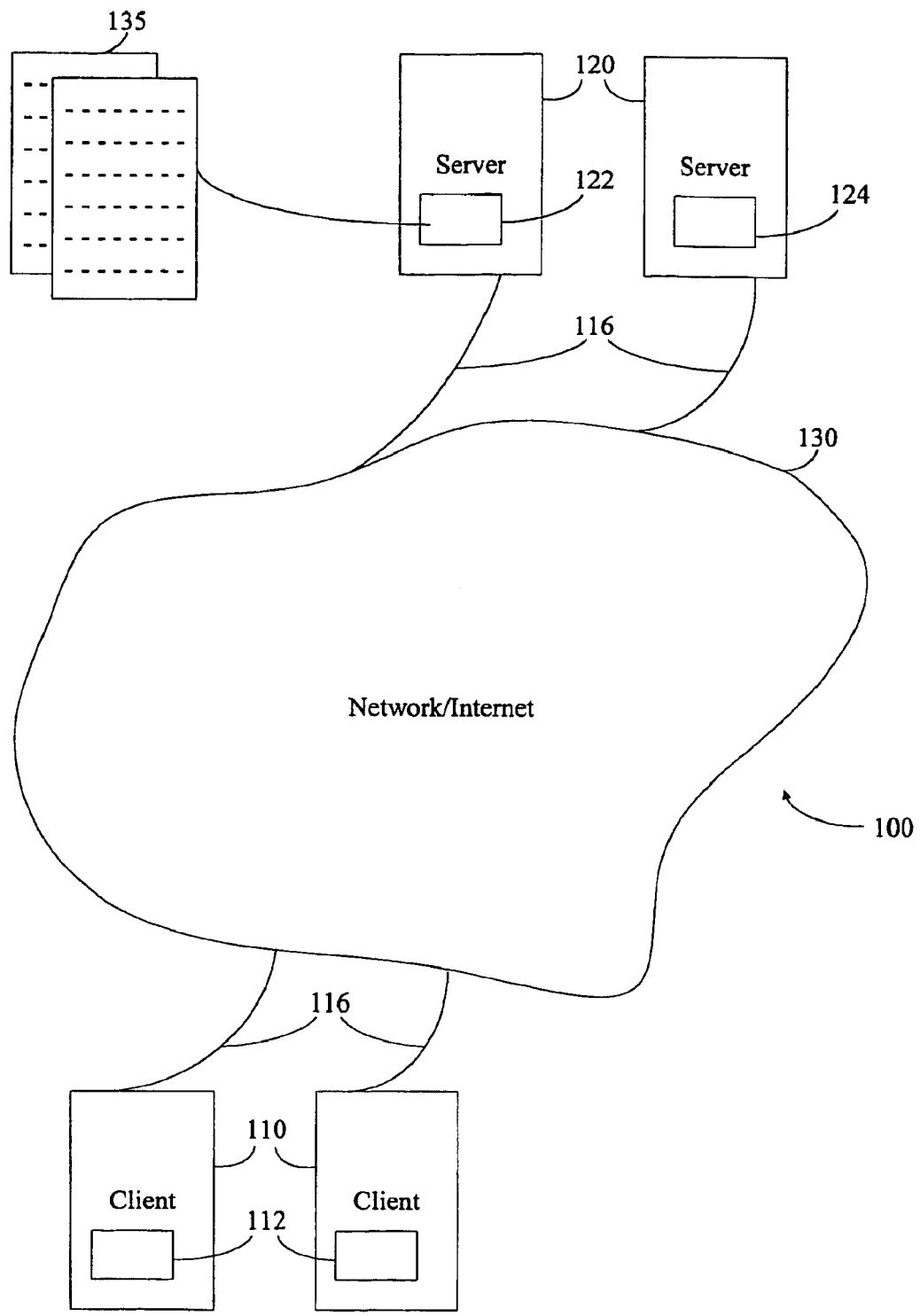
FIG. 1a is a block diagram of an exemplary distributed computer system in accordance with the present invention.

The present invention will now be described with reference to the drawings, wherein like reference numerals are used to refer to like elements throughout.

Turning first to the nomenclature of the specification, the detailed description that follows represents processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

FIG. 1a illustrates an exemplary system for providing a distributed computer system 100 in accordance with one aspect of the present invention and may include client computers or any network access apparatus 110 connected to server computers 120 via a network 130. The network 130 may use Internet communications protocols (IP) to allow clients 110 to communicate with servers 120. The network access apparatus 110 may include a modem or like transceiver to communicate with the electronic network 130. The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may provide an on-line service, an Internet service provider, a local area network service, a wide area network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, an internet television, a set top box, a web-enabled telephone, an internet appliance, a portable wireless device, a game player, a video recorder, and/or an audio component, for example.

Each client 110 typically includes one or more processors, memories, and input/output devices. An input device may be any suitable device for the user to give input to client computer system 110, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eyetracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touchscreen, a display with an integrated keyboard, or a speech-recognition unit combined with a text-to-speech converter.

For example, input/output device may be a standard touch-tone telephone. However, the network transport may be intercom circuits, Integrated. Services Digital Network (ISDN) lines, T1 lines, POTS lines, modem lines, video lines, and Ethernet Hub. Advanced network information such as Automatic Number Identification ("ANI") (also known as caller ID) and Dialed Number Identification Service ("DNIS") may be passed by the network and recognized by the system.

ANI or DNIS may be used to identify area code of the subscriber, registrant, or customer accessing the system 100.

Telephony circuits may include, among other circuits, circuits for interfacing with input/output devices. These circuits may include a voice circuit having a touch-tone recognition circuit and voice processing circuit, as well as other functions. Other circuits may include switching circuits, text to speech circuits, facsimile ("fax") circuits, automatic speech recognition circuits, multimedia circuits, modem circuits, video circuits, and adapter circuits. These circuits may-enable subscribers or others to input information by way of touch tones, pulses, voice, video, or equivalents thereof. Other input and output devices for accessing system may also include television signals, wireless communication devices, Internet devices and electronic mail devices. In alternate embodiments, voice recognition signatures may be recognized by a system using speech recognition circuits.

As is known in the art, telephone calls may be routed from a calling Subscriber to a called Subscriber through a network of switches. Subscribers connected to a common switch may be assigned a unique directory number, NXX-XXXX, where "N" refers to any digit except 0 or 1 and "X" refers to any one of 10 digits. As is also known in the art, the telephone system divides the United States into "area codes"; more technically referred to as Numbering Plan Area (NPA) codes.

When a call is made from one "area code" to another "area code", the three digit Numbering Plan Area code, NPA, prefix must be supplied to the called Subscriber's directory number (DN). Thus, in effect, each telephone Subscriber is associated with a unique ten digit directory number; NPA-NXX-XXXX.

The servers 120 may be similarly configured. However, in many instances server sites 120 include many computers, perhaps connected by a separate private network. In fact, the network 130 may include hundreds of thousands of individual networks of computers. Although client computers 110 are shown separate from the server computers 120, it is understood that a single computer might perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional devices. Those skilled in the art will appreciate that the present invention may also be practiced via Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 may be in the form of Web pages 135. The pages 135 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 135. The browser programs 112 enable users to enter addresses of specific Web pages 135 to be retrieved. Typically, the address of a Web page is specified as a URI or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

Figure 1B:
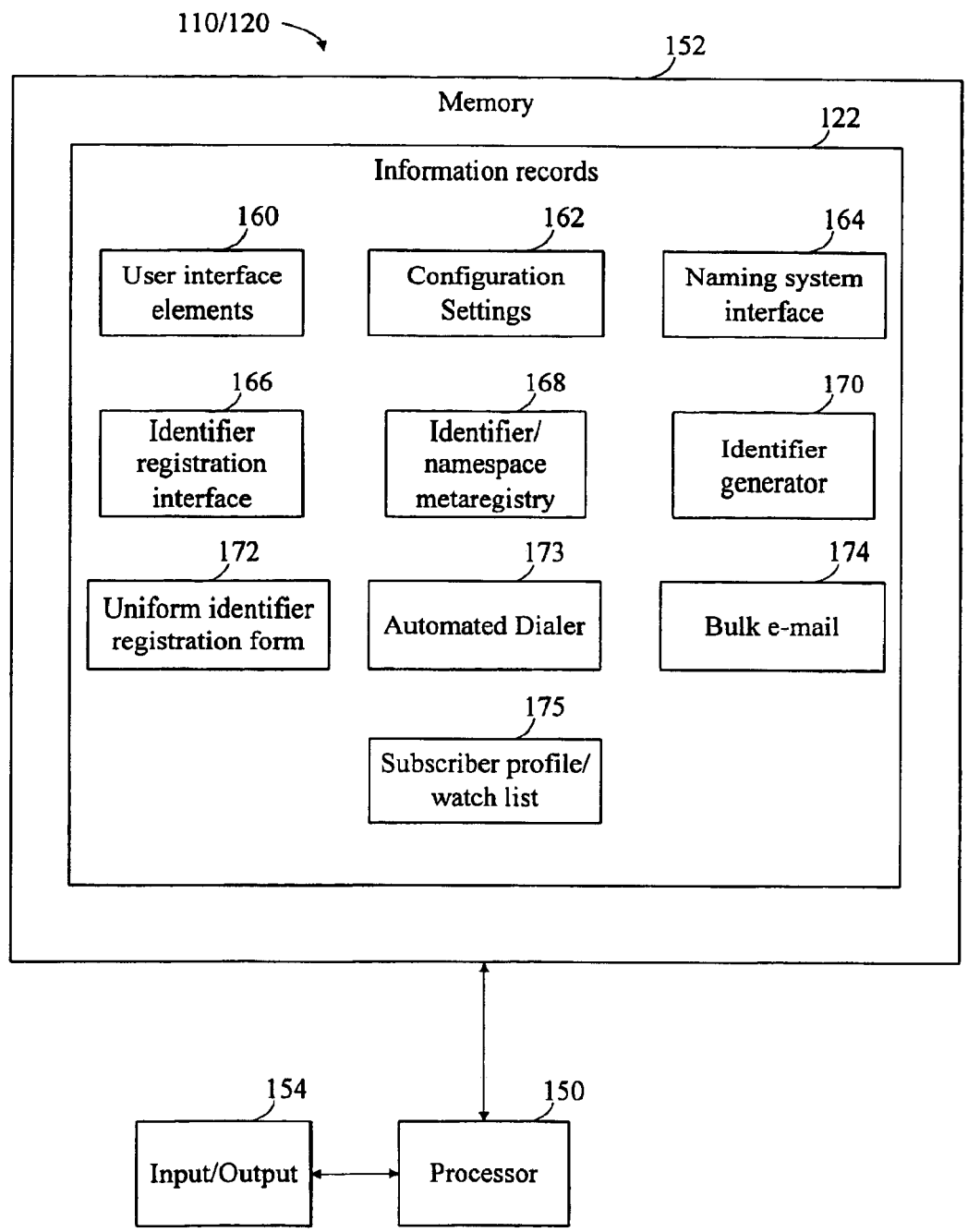
FIG. 1b is a block diagram illustrating exemplary information records and/or programs stored in memory in accordance with the present invention.

FIG. 1b illustrates a block diagram of a processor 150 coupled to a storage device such as memory 152 and to input/output devices 154 in a client 110 and/or server 120 computing system. Stored in memory 152 may be programs, scripts, and information records 122 having any combination of exemplary content such as computer executable instructions, program code, interface elements, lists, files, and databases. Such records may include for example: user interface elements 160, configuration settings 162, naming system interface 164, identifier registration interface 166, identifier metaregistry 168, identifier generator 170, universal identifier registration form 172, automated dialer 173, bulk e-mail 174, and subscriber profile/watch list 175. These memory elements 152 may be further introduced and discussed in more detail throughout the disclosure of the present invention.

Figure 1C:
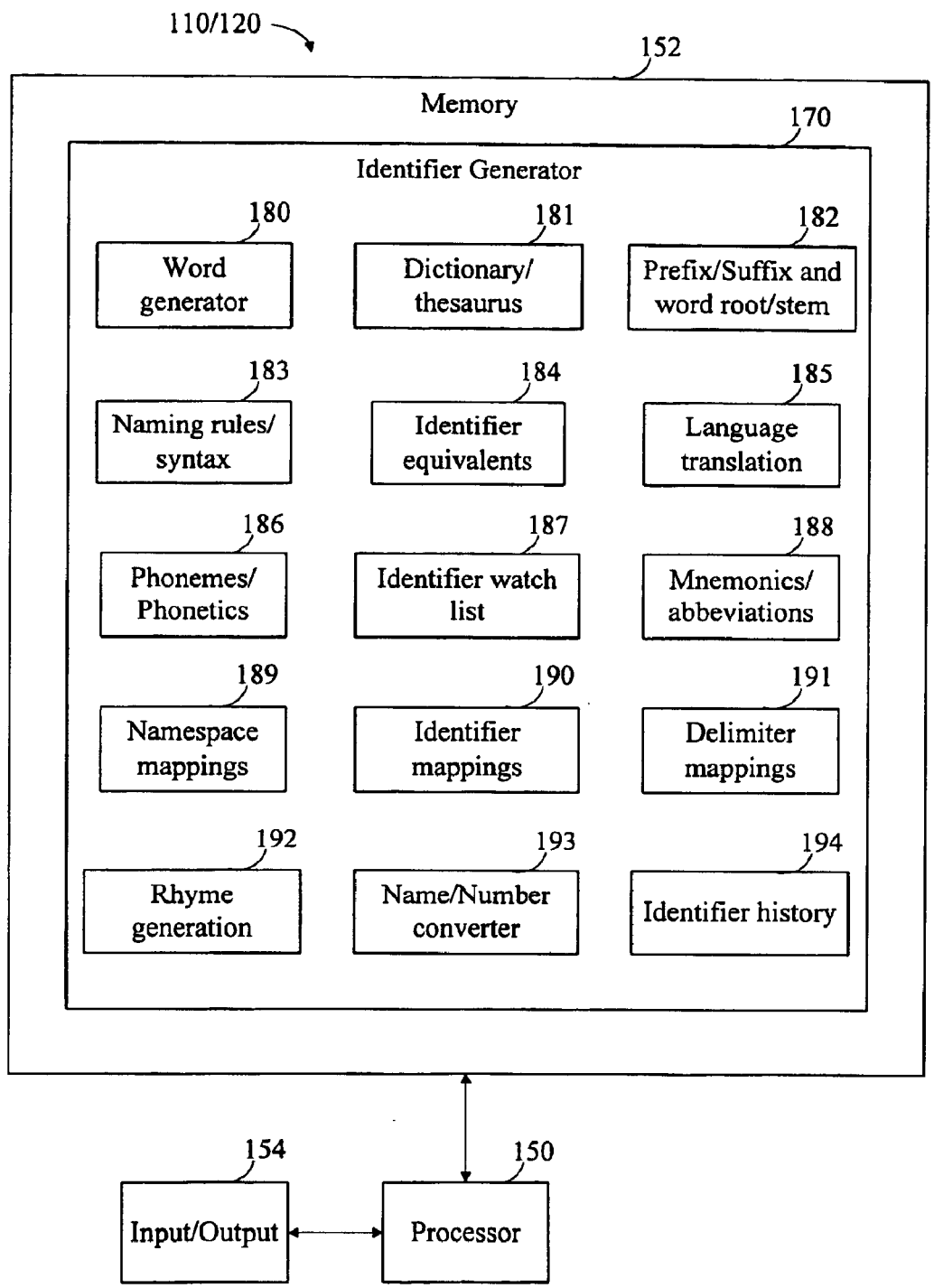
FIG. 1c is a block diagram illustrating identifier generator components stored in memory in accordance with the present invention.

FIG. 1c illustrates a block diagram of a processor 150 coupled to a storage device such as memory 152 and to input/output devices 154 in a client 110 and/or server 120 computing system. Stored in memory 152 are elements/components of an identifier generator 170. Such components may include for example: word generation methods 180, dictionary/thesaurus 181, prefix/suffix and word root/stem 182, set of heuristic naming rules/namespace syntax 183, identifier equivalents 184, language translation 185, phonetics/phonemes (e.g., misspelling) 186, identifier watch list 187 (e.g., list of desirable descriptors, personal identifier portfolio, competitor identifier portfolio), mnemonics/abbreviations 188, namespace mappings 189, identifier mapping 190, delimiter mapping 191, rhyme generation 192, name/number conversion 193, and identifier history 194. These identifier generator components 170 may be further introduced and discussed in more detail throughout the disclosure of the present invention.

Figure 2A:
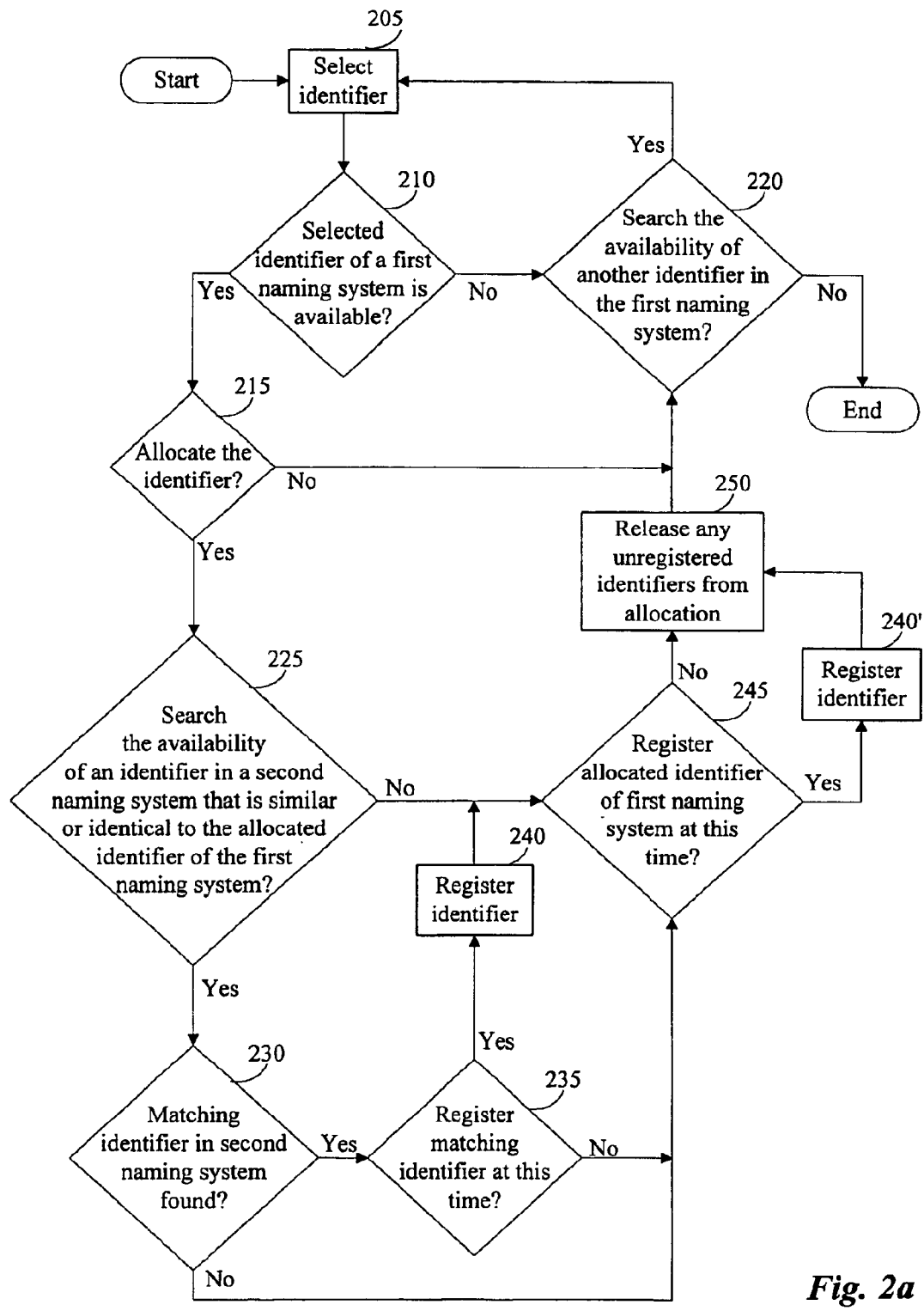
FIG. 2a is a flowchart illustrating the steps performed for allocating/registering similar identifiers across a plurality of naming systems in accordance with the present invention.

FIG. 2a illustrates a top-level flowchart of the steps performed for allocating and/or registering similar identifiers across a plurality of registerable naming systems. A device such as a network access apparatus 110, serylet, applet, stand-alone executable program, or user interface element 160 such as a text box object, command line, speech to text interface, location field of a web browser 112, may receive a selected identifier in step 205, and may determine in step 210 whether the selected identifier of a first naming system is available. A prompt may be displayed for a user to determine in step 215 whether the available identifier is to be allocated. When there is no allocation of the selected identifier or when a selected identifier is not available, a user may be prompted to search in step 220 for the availability of another identifier of the first naming system. When this is the case, steps (205, 210, 215) may be repeated. When the selected identifier is allocated, the availability of an identifier in a second naming system that is similar or identical to the allocated identifier of the first naming system may be searched in step 225. When it is determined in step 230 that a matching identifier in a second naming system is found, then it may further be determined in step 235 whether the matching identifier is to be registered at this time. When this is the case, the identifier of the second naming system may be registered in step 240.

If there is no search for a matching identifier (step 225), or no matching identifier of a search is found (step 230), or a found matching identifier is not registered at this time (step 235), then it may be determined in step 245 whether the allocated identifier of the first naming system is to be registered at this time. If this is the case, then the identifier of the first naming system may be registered in step 240'. After registration, or when it is determined in step 245 that any allocated identifiers of any naming system is not registered at this time, then all unregistered identifiers may be released in step 250 from allocation. A user may then be prompted to search in step 220 for the availability of another identifier and the above steps of FIG. 2a may be repeated for the next selected identifier. Though the steps discussed above illustrate the serial allocation/registration of similar or matching identifiers across two naming systems, the invention is by no means limited to such an embodiment. It will be appreciated by those skilled in the art that similar steps may be repeated in such a way as to extend the registration process across a plurality of (n-number) naming systems either in sequence or in parallel.

Figure 2B:
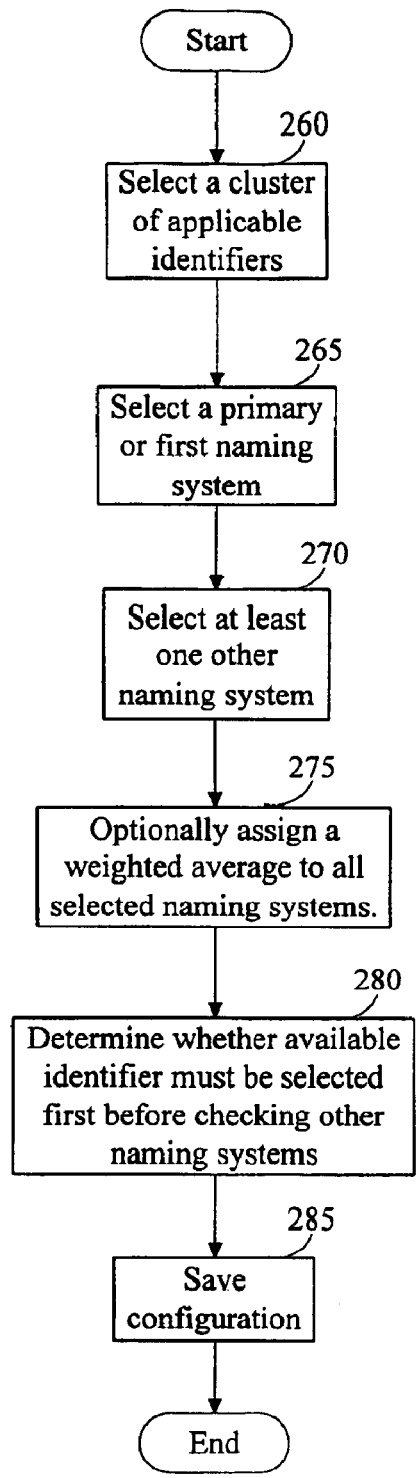
FIG. 2b is a flowchart illustrating the steps performed for configuring a registration system in accordance with the present invention.

FIG. 2b illustrates how configuration settings 162 may be applied to broaden the use of the steps discussed in FIG. 2a.

A cluster/group of identifiers may be selected in step 260 from an identifier registration interface 166 either by brainstorming, namesmithing, or executing a program that assists in the selection of identifiers by generating at least one identifier from an identifier generator 170 having name generation methods (e.g., rhyming, dictionary, thesaurus, misspelling, combining partial names, etc.) that correspond to input from either a provider, subscriber, or both. Such input may further include heuristic naming rules 183 (e.g., namespace/syntax, identifier equivalents, and mappings, etc.) for any accessible naming system, an identifier watch list 187 such as a list of desired descriptors (e.g., existing identifiers of a portfolio, the portfolio of a competitor's identifiers, etc.), phonetic spelling 186, mnemonics 188, repetition within a mnemonic. In effect, identifiers may be selected by consulting from one of a word generation method 180, dictionary/thesaurus 181, prefix/suffix and root/stem 182, set of heuristic naming rules/namespace syntax 183, identifier equivalent 184, language translation 185, phonetics/phonemes 186, identifier watch list 187 (e.g., list of desirable descriptors, personal identifier portfolio, competitor identifier portfolio), mnemonics/abbreviation 188, namespace mapping 189, identifier mapping 190, delimiter mapping 191, rhyme generation 192, name/number conversion 193, and identifier history 194.

After identifier selection in step 260, a primary or first naming system may be selected in step 265 from a naming system interface 164. At least one second naming system may then be selected in step 270 from a group of selected naming systems. Weighted averages may then be optionally assigned in step 275 to all selected naming systems in order to prioritize acceptable levels for generating a more unified identity across naming systems. By selecting a primary naming system (step 265) or including weighted averages (step 275) allows for the registration system to determine which identifiers are more critical or important with respect to finding availability, etc. For instance, a user of such a system may designate a domain name as the primary identifier and to select similar identifiers in other naming systems based upon the primary identifier found to be available. A provider or subscriber may then determine in step 280 whether the available identifier must be selected first, before checking availability in other naming systems. By so choosing, determines whether the steps of registration are pending a first availability, and identifiers are to be temporarily allocated or reserved, until availability is determined across other systems. After all selections are made, such configured preferences may be saved in step 285 and stored in user modifiable configuration settings 162 as a preset, or the like. An identifier metaregistry 168 may be used to reduce network bandwidth when determining identifier availability. The metaregistry 168 serves as a registry of registries to more quickly locate identifier registration across separate namespaces and naming systems. In addition, the metaregistry may be configured as a distributed cache throughout the network 100 similar to that of the DNS.

As discussed in U.S. patent application Ser. No. 09/440,606 filed Nov. 15, 1999, by Schneider, entitled "Method and apparatus for information delivery", a subscriber/client may execute a program to generate mnemonic conversions of telephone numbers into letters or combination of letters/numbers for selecting what phone numbers might have a personal significance, or commercial purpose, etc. helping the public to identify potentially newly available desirable telephone numbers in advance. Though implied, the use of such naming tool programs on the provider side adds value by being able to generate available desirable names that are suggested to the customer, subscriber, or registrant. Suggestive selling of available identifiers creates a "push" business model and generates more revenue by targeting desirable identifiers to recipients.

Figure 3A:
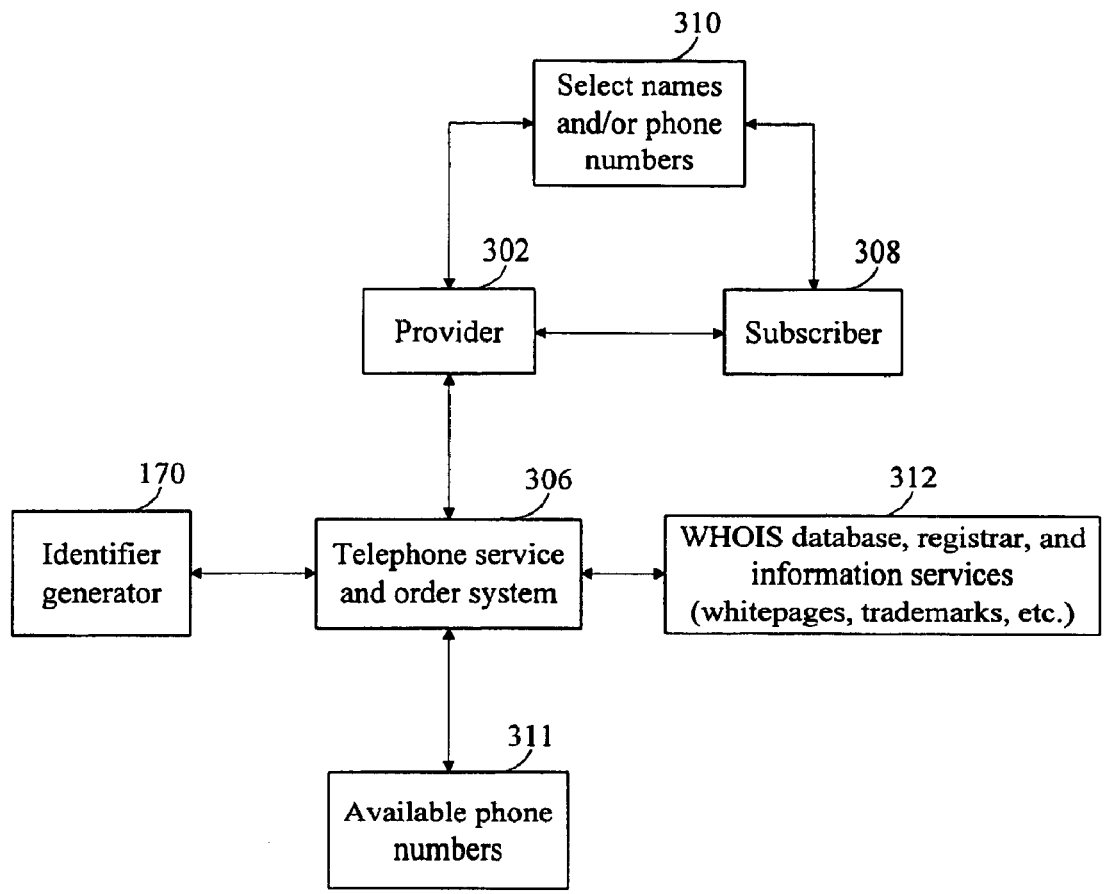
FIG. 3a is a block diagram depicting how a provider may assist a subscriber with the selection of an identifier in accordance with the present invention.

FIG. 3a illustrates a telephone operator/provider 302 enabled to use an identifier generator 170 that may couple to a telephone service and order system 306 to convert the numberspace of a phone number into an equivalent namespace mnemonic of the same phone number or vice-versa. There is a cooperation and negotiation that occurs between a telephone subscriber 308 and operator/provider 302. Input words 310 may be supplied to the operator and are used in conjunction with the name generating program 304 (operates upon the rules of a telephone namespace) and may further integrate with a database 311 of all available telephone numbers to help the telephone operator 302 return a selection of acceptable phone numbers to the subscriber 308. A WHOIS database 312 for domain names may also be coupled to the telephone service and order system 306 for an operator to retrieve "411" information on domain names as discussed in more detail in FIG. 3c.

Figure 3B:
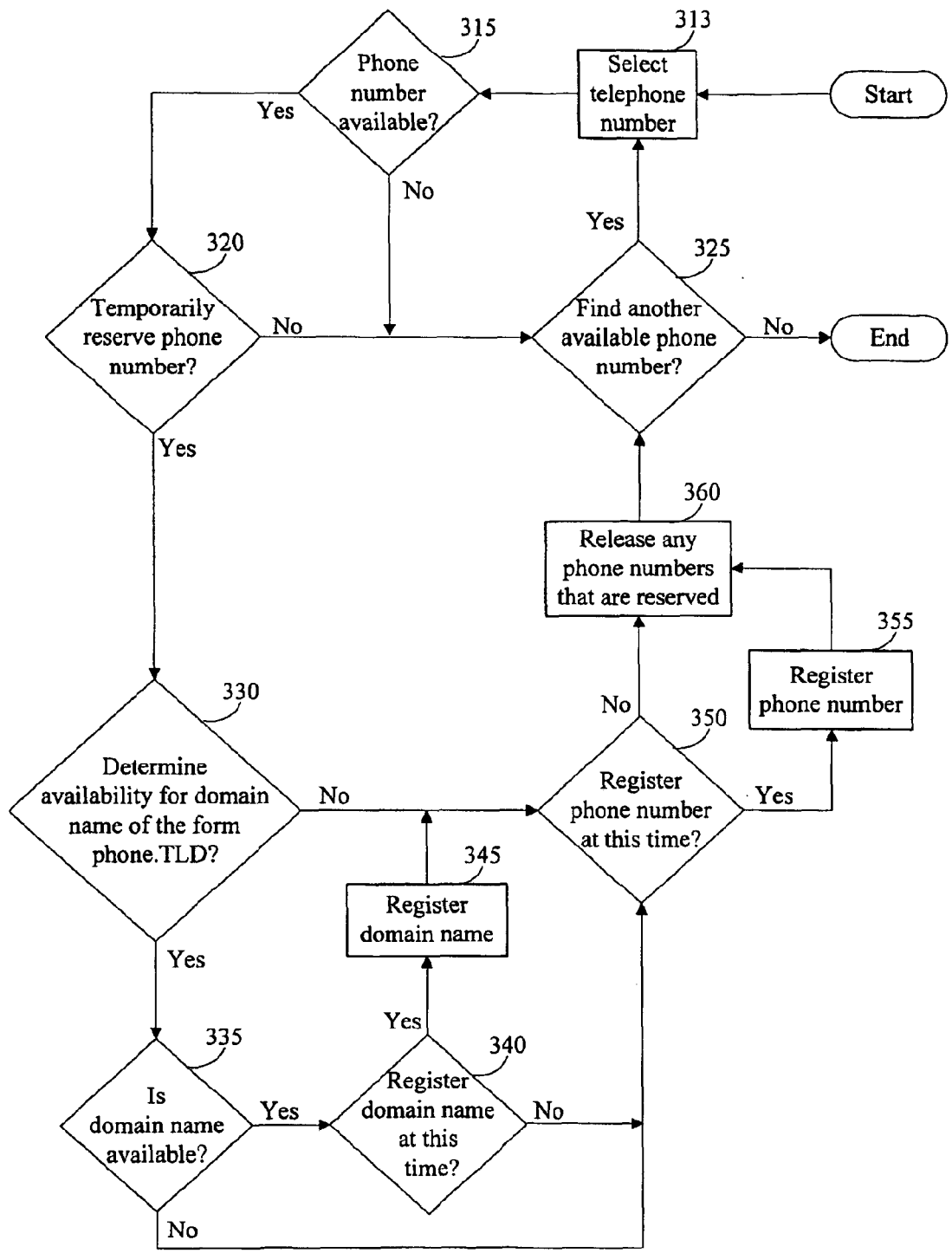
FIG. 3b is a flowchart illustrating the steps performed for integrating the registration process for phone numbers and other identifiers such as domain names in accordance with the present invention.

FIG. 3b illustrates the steps performed for integrating the registration process of phone numbers and other identifiers such as domain names. A phone number may be selected in step 313 and determined available in step 315. When there is no interest in reserving in step 320 the selected phone number, or when it is determined in step 315 that a phone number is not available, then it may be determined in step 325 whether another available phone number is to be found. Steps (313, 315, 320) may be repeated until it is determined in step 320 that a new or existing subscriber would like to temporarily reserve the phone number while determining whether identifiers similar to the phone number may be available across other naming systems. Other naming systems may include keywords, domain names, trademarks, etc. For instance, the selected phone number, "555-1234" is determined available and temporarily reserved, while it is determined in step 330 whether the domain name of the form, Phone.TLD (e.g., "555-1234.com", "555-1234.net", etc.) is checked for availability. If so, and the domain name is determined in step 335 to be available, and it is further determined in step 340 that the domain name is to be registered at this time, then the domain name may be registered in step 345. After the domain name is registered (step 345) or when the availability of the domain name is not to be determined (step 330) or the domain name is determined to be not available (step 335) or an available domain name is not to be registered at this time (step 340), then it may be determined in step 350 whether the reserved phone number is to be registered at this time. If this is the case, then the phone number may be registered in step 355. After phone number registration (step 355) or when it is determined that any reserved phone numbers are not to be registered (step 350), then all reserved phone numbers may be released in step 360 at this time. It then may be determined in step 325 whether another available phone number is to be found. Steps (313, 315, 320) may be repeated until it is determined in step 320 that a new or existing subscriber would like to temporarily reserve the available phone number and any of the above steps of FIG. 3b may be repeated as needed. The above steps illustrate an overall system for integrating the allocation of phone numbers concurrently with other identifiers.

Such a system may be most commonly integrated into any telephone service and order system 306 as discussed in FIG. 3a. For instance, when a subscriber 308 calls in for a maintenance call or for additional services, the telephone operator/provider 302 or customer service representative may now have the ability to offer domain name registration 312 through a registrar by having such an integrated ordering and service system 306 prompt or suggest (push) the availability of the phone number in the form of Phone.TLD to the subscriber 308. The system may be configured to perform a WHOIS function 312 to confirm availability before suggesting the domain name to the subscriber 308 or customer. The phone order and service system 306 may have further integration features to extend "411" or information services of an operator 302 to include the step (not shown) of querying via telephone or other access device in real time for the availability or WHOIS record 312 of a domain name and have the phone service system 306 charge (e.g., $0.25) per query and add such charges to the subscriber's 308 next phone bill.

Figure 3C:
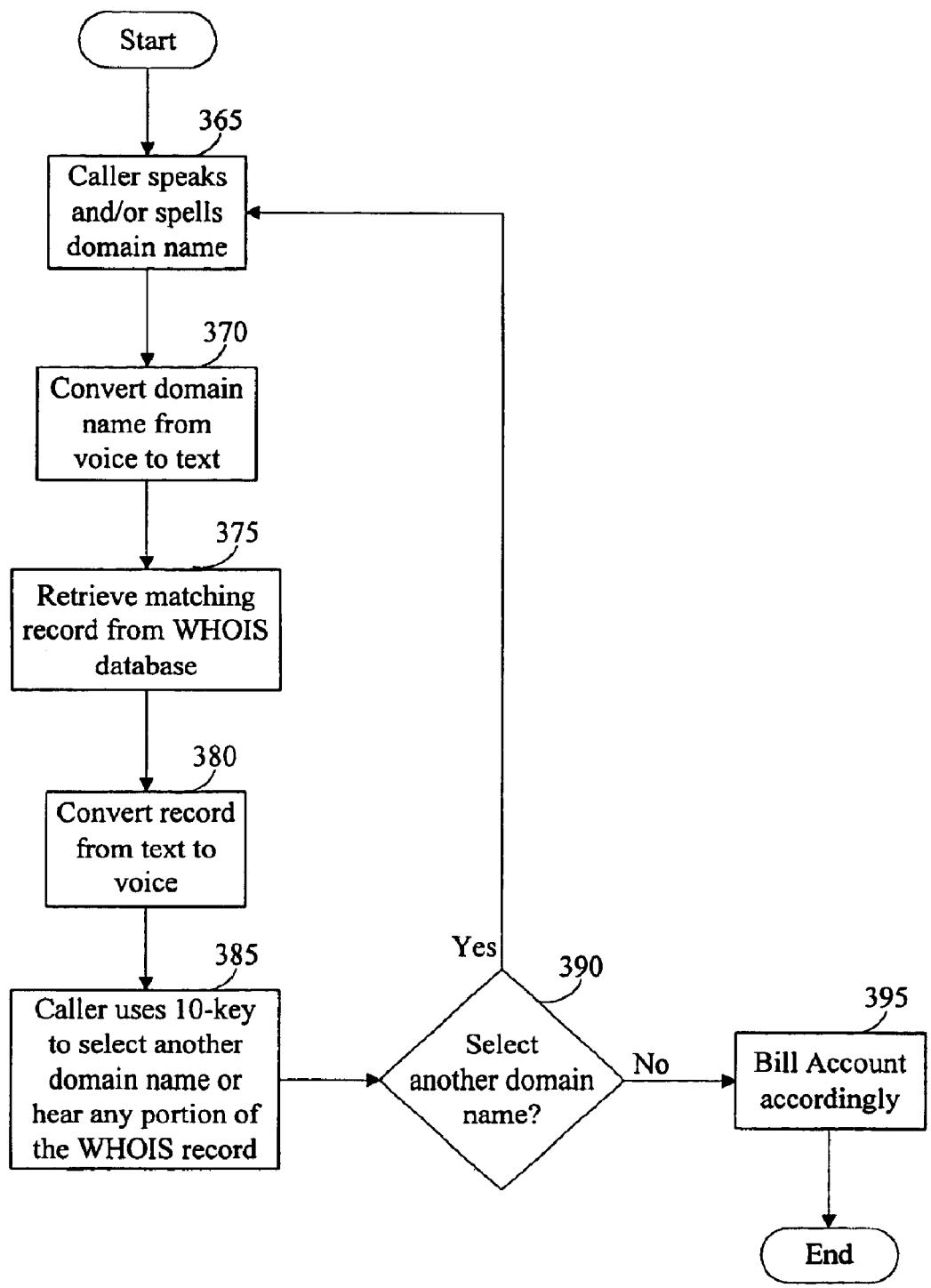
FIG. 3c is a flowchart illustrating the steps performed for accessing WHOIS records via telephone in accordance with the present invention.

FIG. 3c illustrates an automated domain name information service. A telephone company (telco) or the like may market such a service by dialing a "X11" number (wherein x does not equal 4 or 9). For instance, a "511" service may be announced to a service area (equivalent to a 411 service for domain names or other identifiers). Of course such a service may be integrated into existing "411"services. Such an information service 312 may be integrated-into the system discussed in FIG. 3a. Either a telephone operator 302 or subscriber 308 may provide a domain name. The system is voice activated, so a domain name may be spoken or spelled aloud in step 365. Number entry is accepted and combined with any voice input to verify spelling of the domain name. The domain name may be converted in step 370 from voice to text. Variations of the converted domain name may populate a voice menu for a subscriber to use a 10-key to verify the correct domain name. Once a domain name is determined and/or selected, a matching record of the domain name may be retrieved in step 375 from the WHOIS database and the record may then be converted in step 380 from text to voice and populate a voice menu for a subscriber to use a 10-key to select another domain name, or hear any portion of the converted WHOIS record. When another domain name is selected in step 390, steps (365-385) may then be repeated until another domain name is not selected in step 390. The subscriber's 302 account may be billed accordingly in step 395 based on usage of the information service 312.

Figure 4:
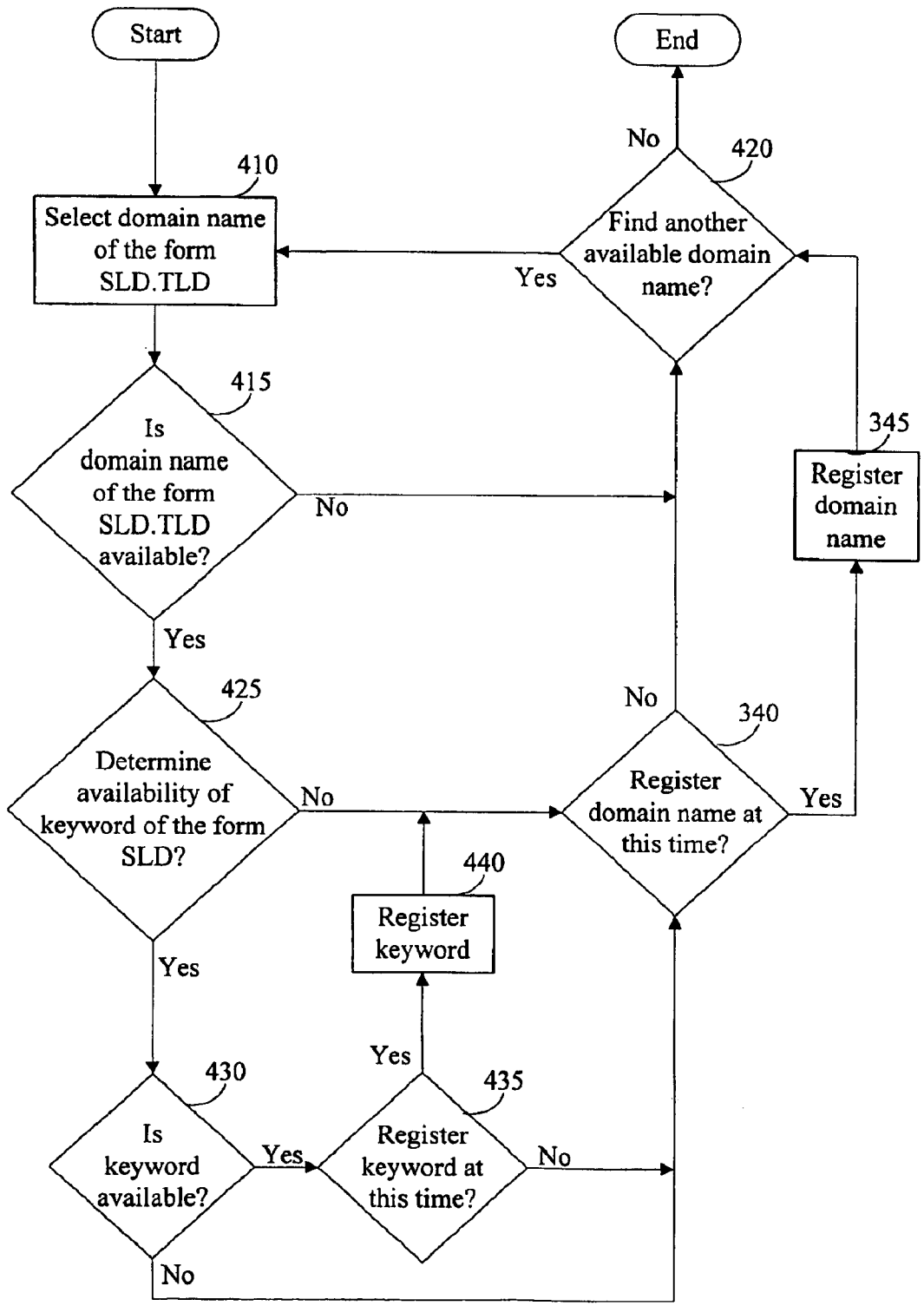
FIG. 4 is a flowchart illustrating the steps performed for integrating the registration process of domain names and other identifiers such as keywords in accordance with the present invention.

FIG. 4 illustrates the steps performed for integrating the registration process for domain names and keywords. A domain name of the form SLD.TLD (e.g., "example.com") may be selected in step 410 and then determined in step 415 whether the selected domain name is available for registration. If no domain name is available, and it is determined in step 420 that another available domain name is to be found, then steps (410, 415, 420) may be repeated until a domain name is available for registration. When the domain name is available (step 415), a keyword of the form SLD (e.g., "example" which is a portion the domain name "example.com") may be generated by consulting the identifier generator 170 and determined in step 425 whether the keyword is to be checked for availability. When keyword availability is determined (step 425) and the keyword is determined in step 430 to be available and it is further determined in step 435 that the keyword is to be registered at this time, then the keyword may be registered in step 440. After the keyword is registered (step 440) or when the availability of the keyword is not to be determined (step 425) or the keyword is determined to be not available (step 430) or an available keyword is not to be registered at this time (step 435), then it may be determined in step 340 whether the domain name is to be registered at this time. If this is the case, then the domain name may be registered in step 345. After registration (step 345) or when it is determined that the domain name is not registered (step 340) then it may be determined in step 420 whether another available domain name is to be found.

The steps of FIG. 4 particularly pertain to extending the registration process of an identifier such as a domain name across other naming systems such as a keyword registry (or vice-versa) operated by a resolution service provider such as RealNames or Netword or operated by the search services of a portal web site or the like such as Alta Vista, Lycos, Netscape, AOL or any other entity that registers keywords for the purposes of directory placement or advertising. For instance, the search for the RealNames Internet Keyword called "example" or the like, may be determined available in response to the determination that the domain name "example.com" is available for registration. Such available identifiers may then be concurrently displayed to the potential registrant for registration. Furthermore, when availability across a plurality of naming systems is determined, an identifier registration interface 166 having a unified identifier registration form 172 may be used to simultaneously register a plurality of identifiers across a plurality of naming systems from a single registration form Such as a universal identifier registration form 172.

Figure 5:
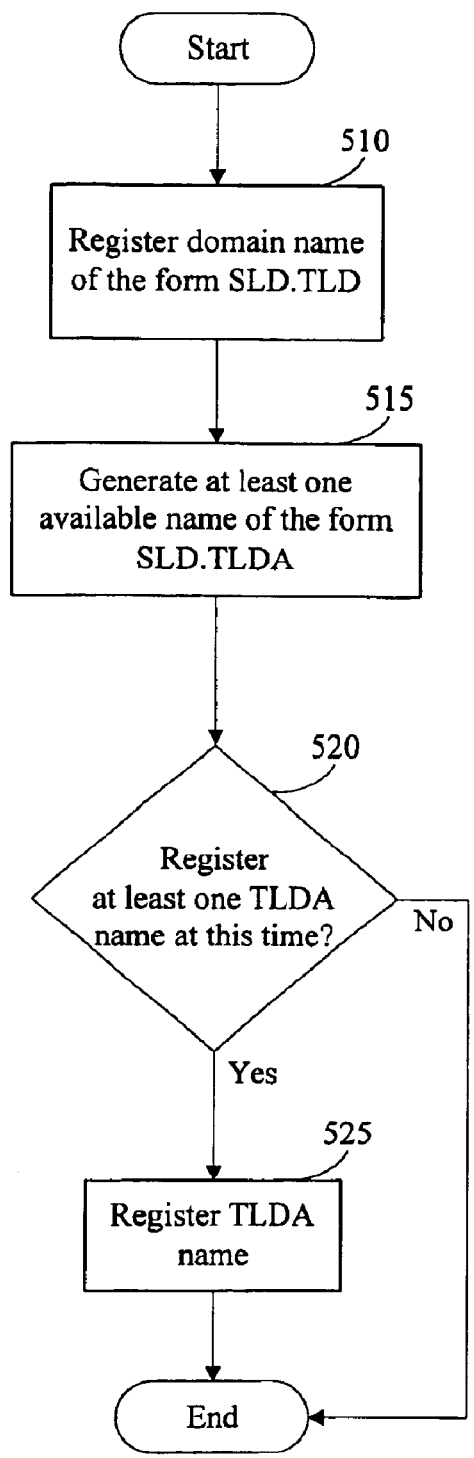
FIG. 5 is a flowchart illustrating the steps performed for integrating the registration process of valid and fictitious domain names in accordance with the present invention.

FIG. 5 illustrates the steps performed for integrating the registration process of valid and fictitious domain names. A valid domain name of the form SLD.TLD (e.g., "example.com") may be registered in step 510 and at least one available fictitious domain name of the form SLD.TLDA (e.g., "example.name") is generated in step 515 by consulting the identifier generator 170 and displayed for concurrent registration in response to the registration of the valid domain name. It may then be determined in step 520 whether any available TLDA names are to be registered at this time. When registration of at least one TLDA name is determined then all selected TLDA names may be registered in step 525. After TLDA registration, or when no TLDA names are registered, steps may be repeated to register other available domain names. For instance, when the valid domain name "example.com" is available for registration, the additional selection of available fictitious domain names (TLDA names) (e.g., "example.news", "example.sitemap", "example.411", etc.) may be concurrently displayed for an potential registrant/entity to register a final selection from the valid or fictitious domain names. Other identifiers such as keywords, phone numbers, etc. may also be concurrently checked for availability (e.g., access the metaregistry 168) and displayed as part of a selection. Examples of concurrent registration may further include the search of a domain name based on the existing handle of an e-mail address (e.g., "myemailaddress.com" is suggested in response to the existing identifier "myemailaddress@example.com").

FIG. 6 illustrates how modifications may be made to a bill/invoice, renewal notice such as a phone bill that is printed/distributed, faxed, e-mailed, accessed electronically, or from a computer readable medium, etc. The telephone number of a subscriber may serve as a first identifier 610. The printing or displaying of at least one available second identifier 615 (in this case a domain name or the like), which may be similar to the first identifier 610. Encoded on a printed phone bill is machine readable code 620 that when read by a network access device 110 can decode the desired available identifier 615 and a subscriber code such as the first identifier 610 from the machine readable code to generate and access content from a URI that performs the function (not shown) of automatic registration of the available identifier 615. When the phone bill is accessed online, a hyperlink 625 may be included in the phone bill for the automatic registration of the available identifier through a universal identifier registration form 172. The extra step of confirming the current availability of the identifier may be performed in real time via the metaregistry 168 or the like. Also included in the phone bill is a preferred choice of at least one identifier from a plurality of available identifiers.

In addition, the suggestion or the temporary reservation of similar or matching telephone identifiers 630 either available or newly available across other area codes is another variation for the suggestive selling of identifiers (e.g., customer has the number 1-216-555-1234 and it is determined that a neighboring area code or another area code such as a toll-free area code has the number 1-330-555-1234, 1-800-555-1234, or mnemonic equivalent is available for subscription). A distributed database of telephone numbers may be maintained in a reverse hierarchy as discussed in U.S. patent application Ser. No. 09/440,606 filed Nov. 15, 1999, by Schneider, entitled "Method and apparatus for information delivery". For instance, a "1234" database may be maintained having data records representing telephone numbers across scattered geographies in the form of NPA-NXX-1234. A "1234" control/reference file is sent, so that at any given point in time, the availability of telephone numbers ending with the number "1234" may be more readily determined due to the minimized transmission of reference data.

Figure 7A:
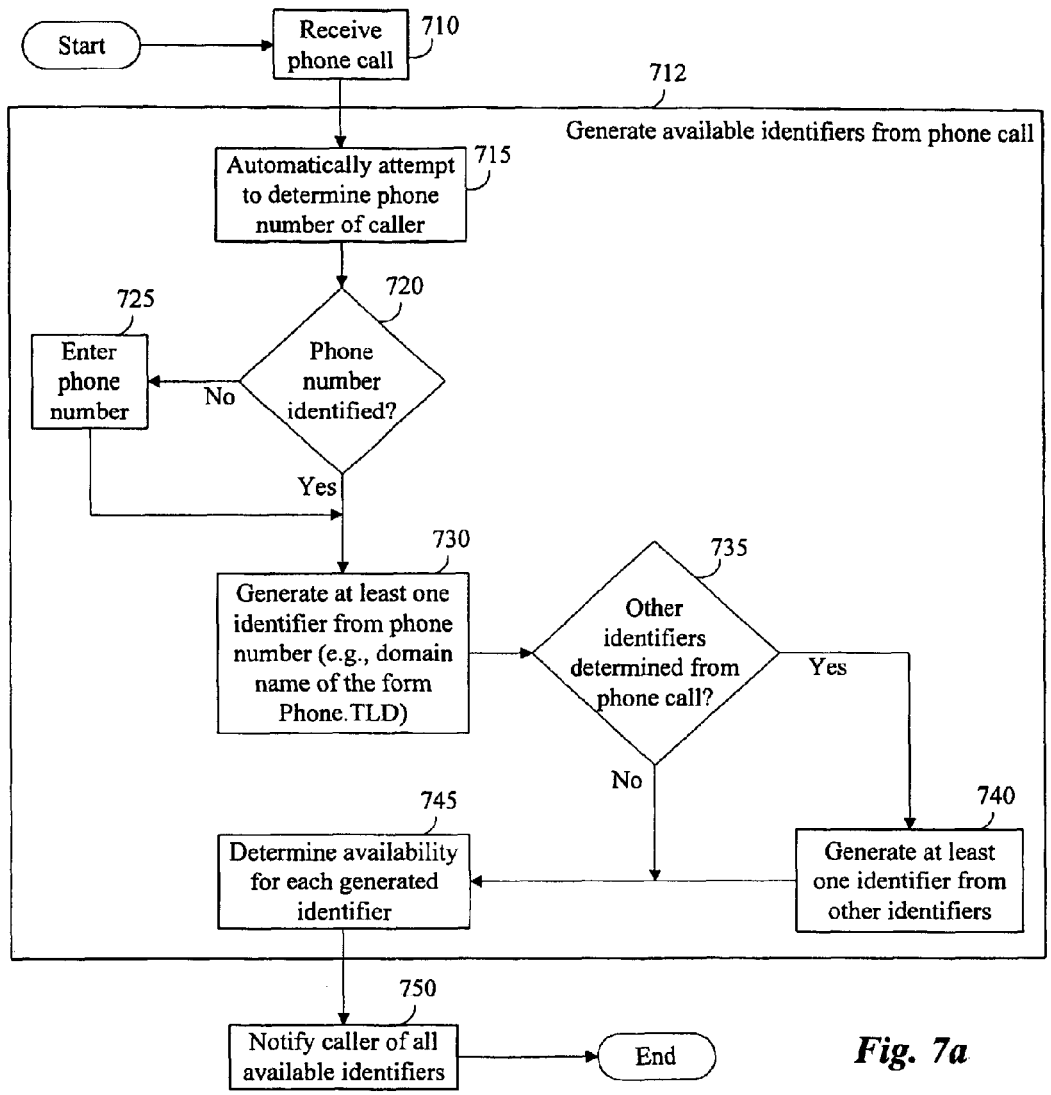
FIG. 7a is a flowchart illustrating the steps performed for determining personalized available identifiers in other naming systems in response to determining a first identifier in accordance with the present invention.

FIG. 7a illustrates the steps performed for using a device capable of identifying an identifier such as a telephone number that is included as part of a push name sales system, or integrated into a telephone order and service system 306. When a call is received in step 710, available identifiers may be generated in step 712, in response to receiving the phone call. A device attempts to determine in step 715 a phone number (e.g., caller ID), or any other identifiers with respect to the origin or login ID of a caller. When a phone number is not identified in step 720, then the caller may be prompted to enter in step 725 a phone number or login ID. At least one identifier may be generated in step 730 (e.g., via the identifier generator 170) in response to the phone number or login ID (e.g., domain name of the form Phone.TLD or loginID.TLD, etc.). When other identifiers are determined in step 735 from the phone call (e.g., ID devices capable of detecting associated URI, e-mail address, screen name, user account information, or other data records that match the phone number may include other identifiers), then at least one identifier may be generated in step 740 from the other identifiers (e.g., via the identifier generator 170). The availability for each detected and/or generated identifier may be determined in step 745 (e.g., via the identifier metaregistry 168). The caller may then be notified in step 750 of all available identifiers. Audio and/or visual notification may be displayed or sent via e-mail. In addition, a 10-key voice menu system may be populated with choices for each generated available identifier for a subscriber to select from, or the interaction between a provider/operator and subscriber/registrant may be considered further means of notification as well.

Similar to how domain names are generated in response to receiving keywords from a search request as explained in U.S. Provisional Application Ser. No. 60/160,125 filed Oct. 18, 1999, by Schneider, entitled "Method and system for integrating resource location, search services, and registration services", personalized identifiers may be generated in response to caller ID, user logins, automated dialing programs, bulk message programs, and the like.

Before dialing a predetermined telephone number, an automated dialer program 173 may be modified to determine identifier availability of interest to the recipient in advance and used to generate a customized sales greeting accordingly, enabling the possibility of suggesting available names and offering more value and opportunity to the recipient of the phone call. A bulk e-mail program 174 may be used in a similar manner. Before sending e-mail to a recipient, available identifiers that correspond to the username or some other attribute may be customized as part of the message content. For instance, the domain holder of "example.com" becomes a recipient of a customized e-mail indicating that the TLDA name "example.sitemap" is available or the keyword "example" or "examples" is also available for registration. These names may be hyperlinked, so that when a recipient activates such a link, a streamlined personalized registration interface 166 is displayed for the recipient to register the suggested available name.

In another example, a subscriber may login to an Internet Service Provider (ISP), the callers phone number may be determined and used to customize the results of a starting web page or send an e-mail to the user indicating that there may be available identifiers in other naming systems (not shown), in response to the determination of a first identifier in this case being the telephone number or username of the caller. Any telephone service center may readily integrate available identifier determination and/or registration services as part of their existing line of services. The system may be a dedicated automated service for the determination, selection, and registration of such identifiers or a provider/operator/service representative may use the information determined by the system in response to assisting the customer/subscriber/registrant with available identifier selection and/or registration services.

Figure 7B:
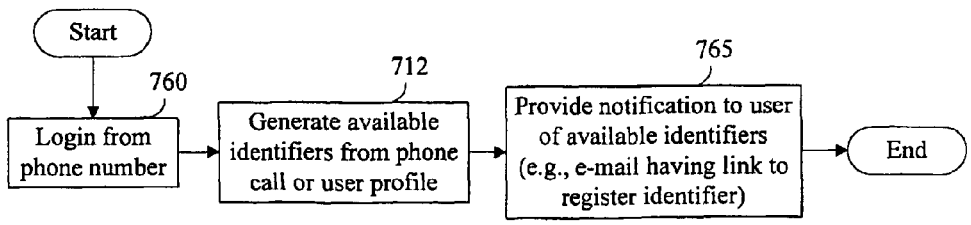
FIG. 7b is a flowchart illustrating the steps performed for determining personalized available identifiers in to a user login in accordance with the present invention.

FIG. 7b is a flowchart illustrating the steps performed for determining available identifiers in response to a user login in accordance with the present invention. After a user has logged-in, in step 760, available identifiers may be generated in step 712, in response to the phone call and/or user profile/subscriber watch list 175. Notification may then be provided in step 765 to the user of any available identifiers of interest (e.g., e-mail having a link to register identifier).

FIG. 8a is a flowchart illustrating the steps performed for suggesting available identifiers that correspond to a callee from an automated dialing system. When a phone number is selected to call in step 810, identifiers corresponding to the phone number may be generated in step 812. The step of generating identifiers may include retrieving in step 815 identifiers such as first and last name, address, domain name, e-mail address and any other information corresponding to the phone number from "411" services (e.g., white pages database), WHOIS database, or any other accessible databases and the step may also include generating in step 820 similar identifiers from any retrieved information (step 815) and determine the status (e.g., availability) for each generated and/or retrieved identifier. The phone number is automatically dialed in step 825 and the name of the callee may be inserted as part of a personalized greeting. The callee may be offered the opportunity to redeem from a selection of available identifiers that corresponds to the retrieved information (step 815). A 10-key menu may be populated to assist the callee in making the selection.

FIG. 8b is a flowchart illustrating the steps performed for suggesting available identifiers that correspond to a recipient via a bulk message system (e.g., mass e-mail, or direct mail campaign). When an e-mail address is selected to send a message in step 840, identifiers corresponding to the e-mail address may be generated in step 812. Notification may then be provided in step 765 to the user of any available identifiers of interest (e.g., e-mail having a link to register identifier).

InterNIC's online glossary defines domain name space (applicable to any namespace) as the sum total of domain names that currently represent networks and computers, as well as all of the possible domain names—not yet in use—which may potentially represent networks and computers. This means that the set of registered domain names are only a part of the total name space wherein the definition of domain name space also includes the set of available domain names that are not registered as of yet. There is novelty by distributing available identifiers as part of a "push" model to generate additional revenue. Other documents or electronic messages may be generated to refer to any content that offers the reservation/allocation of related identifiers in response to an existing identifier. For instance, Department of Motor Vehicles (DMV) may distribute a message for updates to vehicle registration or a car insurance company may send a renewal notice that includes a list of at least one available domain name in the form of "LicensePlate.TLD".

Other examples may include, third party vendors generating available identifiers in a domain name space from registered/unavailable identifiers extracted the from databases of other naming systems (e.g., Copyright, ISBN, UPC, or state and federal tradename and trademark data). Although the generation of available domain names are suggested or pushed via printed matter, e-mail, fax, etc. to a recipient such as a potential or existing registrant, customer, or subscriber as discussed in U.S. patent application Ser. No. 09/532,500 filed Mar. 21, 2000, by Schneider, entitled "Fictitious domain name method, product, and apparatus", it is clear from the above illustration that there are additional steps that further support novelty of pushing, upselling, or the suggestive selling of available identifiers that may be suitable for registration of any given entity, registrant, or subscriber.

Also, as discussed the present invention is by no means limited to the registration of identifiers such as domain names (e.g., valid domain names, fictitious domain names including TLDA names, and multilingual domain names), phone numbers (e.g., cell, fax, telecopier, pager, voice, data, etc.), and keywords (e.g., search term, RealName, Netword, Internet keyword, AOL keyword, etc.). Other registerable naming systems having one or more registerable namespaces may include identifiers such as but not limited to Publisher Item Identifier (PII), Digital Object Identifier (DOI), Inter Deposit Digital Number (IDDN), International Standard Book Number (ISBN), International Standard Technical Report Number (ISRN), International Standard Serial Number (ISSN), Serial Item and Contribution Identifier (SICI), Book Item and Component Identifier (BICI), European Article Number (EAN), Universal Product Code (UPC), Standard Address Number (SAN), International Standard Audiovisual Number (ISAN), International Standard Work Code (ISWC), International Standard Music Number (ISMN), International Standard Recording Code (ISRC), Intellectual Property Identification (IPI), Uniform File Identifier (UFI), Uniform Resource Identifier (URI), Persistent Uniform Resource Locator (PURL), Universally Unique Identifier (UUID); Globally Unique Identifier (GUID), Namespace Identifier (NID), Bank Identification Number (BIN), Personal Identification Number (PIN), Mod 10 Number, credit card number, Electronic Serial Number (ESN), Mobile Identification Number (MIN), Automatic Number Identification (ANI), Social Security Number (SSN), Employer Identification Number (EIN), Taxpayer Identification Number (TIN), Vehicle Identification Number (VIN), World manufacturer identifier (WMI), Manufacturer Identification Number (MIN), Market Identifier Code (MIC), Standard Industrial Classification (SIC), Standard Occupational Classification (SOC), Stock Keeping Unit number (SKU), International Business Entity Identifier (IBEI), Institution Identification Code (IIC), National Provider Identifier (NPI), Dunn and Bradstreet Number (DUNS), SEC file number, patent number, trademark number, serial number, charter number, policy number, certification number, document identifier, reference number, invoice number, transaction identifier, validation code, account number, merchant code, reseller code, affiliate code, authorization code, network identifier, user identifier, PGP key, digital certificate, driver license number, license plate number, trademark, servicemark, tradename, fictitious name, company name, DBA, AKA, stock symbol, station identifier, broadcast station call letters, ham radio call letters, broadcast frequency number, street name, street address, ZIP code, IP address, host, e-mail address, ICQ number, nickname, screen name, username, alias, handle, document title, book title, song title, movie title, phrase, slogan, machine readable code, glyph, image, icon, animation, sequence of musical notes, date, time, name, abbreviation, mnemonic, moniker, label, alphanumeric, string, character, symbol, token, integer, and number, etc.

Some naming systems may include a domain name system, fictitious domain name system, multilingual naming system, keyword system, telephone naming and numbering system, user naming system, address system, time system, language system, Dewey decimal system, catalog naming system, document system, resource naming system, image naming system, geographic naming system, Government naming system, identification naming system, and/or any other naming system that supports any listed identifier.

Other examples of naming systems may include languages. Name generating programs may further include language translation 185 as a means for selecting similar identifiers. The mapping of delimiters 191 across all naming systems may also be used as a means for similar identifier selection. Each naming system may be the primary registrar with respect to registering on behalf of registrars of other naming systems for concurrent registration. An open architecture system is implemented such that existing or future-naming systems may be easily integrated into alternate embodiments of the present invention. Each integrated system remains highly configurable to the specific context of the application.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

I claim:

1. An identifier registration method comprising:
   selecting at least two registerable naming systems from a group of registerable naming systems including a domain name system, a top level domain alias naming system, a multilingual naming system, a fictitious identifier naming system, a trademark naming system, a keyword naming system, a telephone number naming system, a username naming system, an account name naming system, a product code naming system, a book number naming system, a catalog identifier naming system, a document identifier naming system, an intellectual property identifier naming system, a manufacturer identifier naming system, a merchant/reseller/affiliate code naming system, an image naming system, a geographic naming system, a classification naming system, and a license plate identifier naming system;
   at least one of a receiving and generating one or more identifiers either, before, during or after said selecting said at least two registerable naming systems, said one or more identifiers having a capability of being registered in said at least two registerable naming systems; and,
   providing a user with an ability to determine whether said one or more identifiers is available for registration in said at least two registerable naming systems.

2. The method, as set forth in claim 1, wherein said at least one of a receiving and generating said one or more identifiers includes at least one of a receiving and generating a plurality of identifiers including at least a first identifier corresponding to a first naming system selected from said group of registerable naming systems and a second identifier corresponding to a second naming system selected from said group of registerable naming systems.

3. The method, as set forth in claim 2, wherein said first identifier and said second identifier are the same identifier or said first identifier and said second identifier are similar identifiers.

4. The method, as set forth in claim 2, wherein said first identifier includes a portion of said second identifier or said second identifier includes a portion of said first identifier.

5. The method, as set forth in claim 2, wherein said generating said one or more identifiers includes generating said one or more identifiers from said first identifier.

6. The method, as set forth in claim 2, further including at least one of a selecting at least one of a first identifier and second identifier from said one or more identifiers and selecting at least one of a first registerable naming system and second registerable naming system from said group of registerable naming systems.

7. The method, as set forth in claim 6, further including generating a second identifier in response to selecting said first identifier.

8. The method, as set forth in claim 6, further including at least one of a concurrently selecting from said first naming system and said second naming system, concurrently selecting from said first identifier and said second identifier, concurrently determining whether said first identifier and said second identifier is available for registration, and concurrently registering said first identifier and said second identifier.

9. The method, as set forth in claim 8, further including allocating said first identifier when it is determined that said first identifier is available for registration and determining whether said second identifier is available for registration further includes determining whether said second identifier is available for registration while said first identifier is allocated.

10. The method, as set forth in claim 1, wherein said generating said one or more identifiers includes generating at least one identifier by consulting from at least one of a word generation method, dictionary, thesaurus, prefix, suffix, word root, word stem, set of heuristic naming rules, namespace syntax, identifier equivalent language translation, phonetic spelling, phonemes, identifier watch list, list of desirable descriptors, personal identifier portfolio, competitor identifier portfolio, mnemonic method, abbreviation, namespace mapping, identifier mapping, delimiter mapping, rhyming method, name-to-number conversion, number-to-name conversion, and identifier history.

11. The method, as set forth in claim 1, further including determining whether said one or more identifiers is available for registration in at least one naming system selected from said group of registerable naming systems.

12. The method, as set forth in claim 11, wherein said determining whether said one or more identifiers is available for registration includes comparing said one or more identifiers to a metaregistry.

13. The method, as set forth in claim 11, further including registering at least one identifier that is determined available for registration.

14. The method, as set forth in claim 13, wherein said registering said at least one identifier that is determined available for registration includes registering said at least one available identifier through an identifier registration interface.

15. The method, as set forth in claim 1, wherein each identifier of said one or more identifiers is one of a valid domain name, fictitious domain name, TLDA name, multilingual domain name, phone number, keyword, search term, RealName, Netword, Internet keyword, AOL keyword, Publisher Item Identifier (PII), Digital Object Identifier (DOI), Inter Deposit Digital Number (IDDN), International Standard Book Number (ISBN), International Standard Technical Report Number (ISRN), International Standard Serial Number (ISSN), Serial Item and Contribution Identifier (SICI), Book Item and Component Identifier (BICI), European Article Number (EAN), Universal Product Code (UPC), Standard Address Number (SAN), International Standard Audiovisual Number (ISAN), International Standard Work Code (ISWC), International Standard Music Number (ISMN), International Standard Recording Code (ISRC), Intellectual Property Identification (IPI), Uniform File Identifier (UFI), Uniform Resource Identifier (URI), Persistent Uniform Resource Locator (PURL), Universally Unique Identifier (UUID), Globally Unique Identifier (GUID), Namespace Identifier (NID), Bank Identification Number (BIN), Personal Identification Number (PIN), Mod 10 Number, credit card number, Electronic Serial Number (ESN), Mobile Identification Number (MIN), Automatic Number Identification (ANI), Social Security Number (SSN), Employer Identification Number (EIN), Taxpayer Identification Number (TIN), Vehicle Identification Number (VIN), World manufacturer identifier (WMI), Manufacturer Identification Number (MIN), Market Identifier Code (MIC), Standard Industrial Classification (SIC), Standard Occupational Classification (SOC), Stock Keeping Unit number (SKU), International Business Entity Identifier (IBEI), Institution Identification Code (IIC), National Provider Identifier (NPI), Dunn and Bradstreet Number (DUNS), SEC file number, patent number, trademark number, serial number, charter number, policy number, certification number, document identifier, reference number, invoice number, transaction identifier, validation code, account number, merchant code, reseller code, affiliate code, authorization code, network identifier, user identifier, PGP key, digital certificate, driver license number, license plate number, trademark, servicemark, tradename, fictitious name, company name, DBA, AKA, stock symbol, station identifier, broadcast station call letters, ham radio call letters, broadcast frequency number, street name, street address, ZIP code, IP address, host, e-mail address, ICQ number, nickname, screen name, username, alias, handle, document title, book title, song title, movie title, phrase, slogan, machine readable code, glyph, image, icon, animation, sequence of musical notes, date, time, name, abbreviation, mnemonic, moniker, label, alphanumeric, string, character, symbol, token, integer, and number.

16. The method, as set forth in claim 1, wherein said providing the user with the ability to determine whether each said generated identifier is available for registration includes one of a providing at least one hyperlink adapted to access an identifier registration service and automatically determining whether each said generated identifier is available for registration.

17. An identifier registration method comprising:
   a user logging in to an account with a first identifier, said first identifier corresponding to account information;
   generating one or more identifiers corresponding to at least one of a first identifier and account information in response to the user said logging in, said one or more identifiers having a capability of being registered in one or more registerable naming systems; and,
   providing the user with an ability to determine whether at least one said generated identifier is available for registration in at least one said one or more registerable naming systems.

18. The method, as set forth in claim 17, wherein said at least one of a first identifier and account information includes at least one of a username, screen name, handle, login ID, uniform resource identifier, first name, last name, street address, domain name, e-mail address, and telephone number.

19. The method, as set forth in claim 17, wherein said providing the user with the ability to determine whether said at least one said generated identifier is available for registration includes one of a providing at least one hyperlink adapted to access an identifier registration service and automatically determining whether said at least one said generated identifier is available for registration.

20. An identifier registration method comprising:
   identifying one of a caller and callee from a first identifier, said first identifier corresponding to account information;
   generating one or more identifiers corresponding to at least one of a first identifier and account information in response to said identifying said one of a caller and callee, said one or more identifiers having a capability of being registered in one or more registerable naming systems; and,
   providing said one of a caller and callee with an ability to determine whether at least one said generated identifier is available for registration in at least one said one or more registerable naming systems.

* * * * *